F. E. COOMBS.
CENTRIFUGAL MACHINE.
APPLICATION FILED MAY 11, 1910.
1,026,075.
Patented May 14, 1912.
2 SHEETS—SHEET 1.
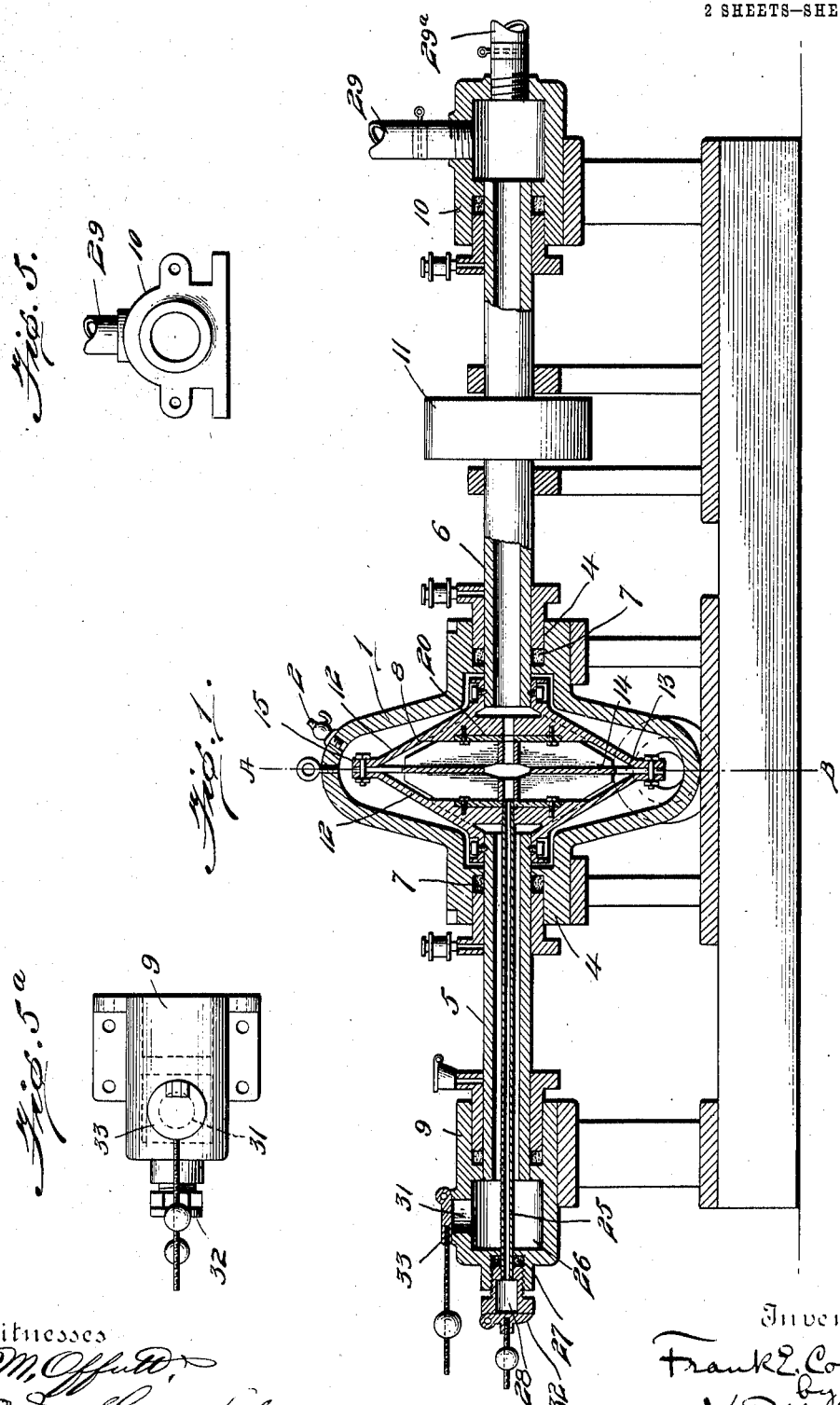

F. E. COOMBS.
CENTRIFUGAL MACHINE.
APPLICATION FILED MAY 11, 1910.
1,026,075.
Patented May 14, 1912.
2 SHEETS—SHEET 2.
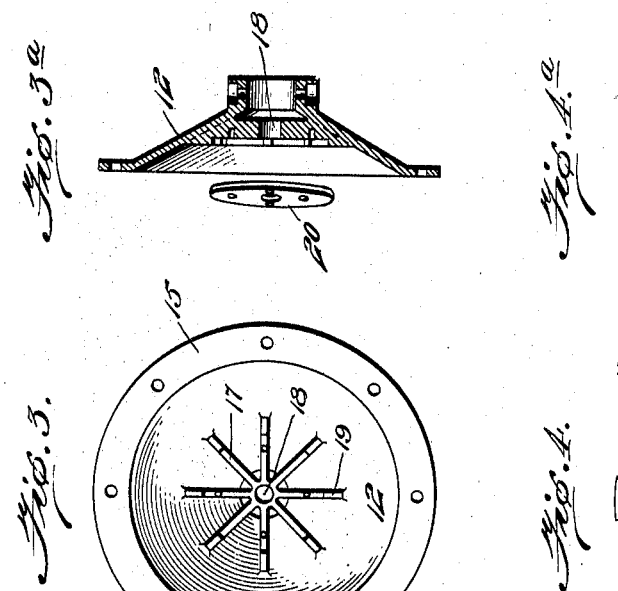
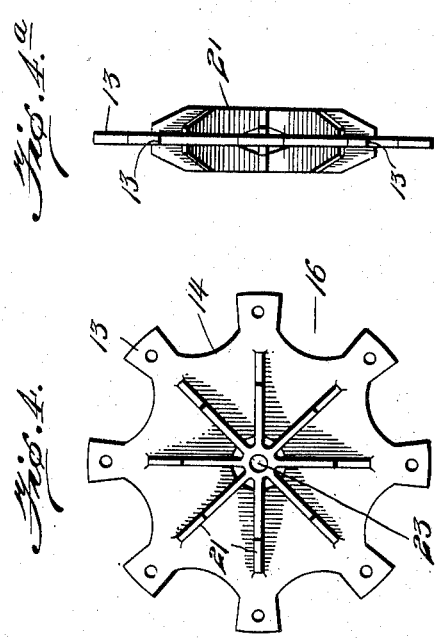
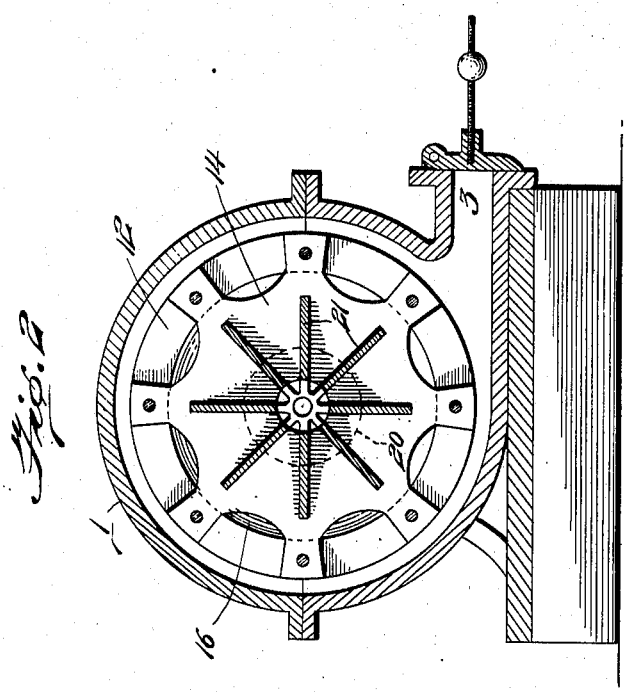
Witnesses
Inventor
Frank E. Coombs
by
K. P. McElroy
Attorney

UNITED STATES PATENT OFFICE.

FRANK E. COOMBS, OF BROOKFIELD, VERMONT.

CENTRIFUGAL MACHINE.

1,026,075.  Specification of Letters Patent.  Patented May 14, 1912.

Application filed May 11, 1910. Serial No. 560,704.

*To all whom it may concern:*

Be it known that I, FRANK E. COOMBS, a citizen of the United States, residing at Brookfield, in the county of Orange and State of Vermont, have invented certain new and useful Improvements in Centrifugal Machines, of which the following is a specification.

This invention relates to centrifugal machines; and it comprises a centrifugal separator adapted to separate a liquid from impurities of differing specific gravities, such separator comprising a rotatable casing having orifices at its points of greatest diameter for the discharge of heavy solid impurities, means for feeding liquid to be purified in a circuitous course to and through said separator, means for removing gaseous and light impurities from the center of the body of liquid in said separator, and a containing casing having means for progressively removing solid impurities therein accumulating; all as more fully hereinafter set forth and as claimed.

In many arts it is necessary to purify a body of water or other liquid from impurities of both greater and less specific gravity and to do this without altering the existing conditions of temperature and pressure. With many such liquids it is desirable to perform the purification at a relatively high temperature to maintain fatty, waxy and resinous bodies in a more or less fluent state. Many such liquids further contain gases either in solution or in suspension, and it is desirable to be able to remove these gases positively while at the same time it is frequently desirable that the conditions of pressure on the liquid shall not be changed within the centrifugal to cause a difference in state of such gas. For instance, in purifying cane juice and similar liquids, it is now a common practice to heat the liquid, with or without the addition of purifying bodies, such as lime under pressure, to a temperature above its normal boiling point. This superheating produces a desirable separation of albumenoids and salts; a separation which is frequently more effective than one conducted under the ordinary pressure and at the ordinary boiling point. But in so superheating a liquid the air and gases which are present are caused to go into solution and upon releasing the pressure the dissolved gas reappears in the form of excessively minute bubbles formed on floating and suspended matter, buoying the same up and preventing a good gravital separation. If limed cane juice for instance be heated under pressure a few degrees above the boiling point, a very good separation of impurities is effected. But on releasing the pressure from this liquid, the impurities which should normally settle are kept floating and suspended by minute bubbles of adhering gas and it is difficult to secure settling and a clear liquid within the limits of the time which can be given in the necessarily hurried operation of a sugar house. Instead of separating as a settled comparatively dense magma, the fine particles of impurities float throughout the solution. Furthermore, on releasing the pressure on the liquid, its temperature necessarily falls and oily, fatty and waxy bodies which are molten at the high temperature tend to solidify and to adhere to contacting floating impurities, from which they cannot thereafter be separated. Being often of light specific gravity they also tend to buoy up the separated solids.

The separator of the present invention is particularly adapted to treat sugar liquids which have undergone a high temperature defecation of this type, but it may of course be employed for many other liquids, as, for instance, in clarifying carbonated beet juice, beer lees, liquids resulting from the Solvay process, etc. Attempts have been made to separate these liquids with rotors having peripheral discharge openings of small area with the idea of accumulating the solids at the periphery of the rotor in such a condition as to form slowly escaping plugs. But as the solid matters contained in these solids are all degrees of fineness, some portions being relatively coarse while other portions are relatively fine, it is difficult to secure a good adjustment in machines of this type.

In the present invention therefore, in the rotor proper I provide a great extent of freely open exit passages at the periphery, such passages being amply wide for the escape of coarse particles peripherally separated, while I surround the rotor with an inclosing body of liquid contained in a stationary member or stator wherein all the heavy solids are obtained as a homogeneous magma. Under these conditions the solids cannot form a plug within the escape openings of the rotor and exist at this point in a freely fluent state susceptible of movement from either receptacle into the other. The rotor is also provided with conduits for the escape of solid or fluent matter of less specific gravity than the body of the liquid treated, and of separated gases. These conduits lead from the central spaces of the rotor and open freely into separate and closed non-rotating receptacles. The impurities thereby withdrawn may be taken off through weighted valves.

In a preferred form of the present invention I may make the rotor of doubly conical form, making it of two conical sections placed together base to base but spaced apart to form escape passages or conduits. Within this rotor I place a series of ribbed and perforated diaphragms so arranged as to cause a more or less circuitous passage of the liquid theretrough. The rotor is mounted on one or more hollow shafts, these shafts being so arranged as to form a feed conduit into one end of the rotor and an escape conduit from the other end of the rotor. The rotor is mounted in a stationary casing adapted to contain a body of liquid and provided with a valved escape opening at an upper point to permit venting of steam and gases, and with a valved escape opening at a lower point for the removal of separated solids. Passing within the hollow shaft is an escape conduit for the separation of light solids or liquids and gases, this escape conduit ending in a stationary chamber provided with a suitable weighted valve.

In the described structure it is obvious that the liquid to be treated may be introduced at any desired temperature and pressure, treated under that temperature and pressure and removed without fall of temperature or pressure. Or the temperature and pressure may be increased or lowered to any desired degree in the passage of the liquid through the separator.

In the accompanying illustration I have shown more or less diagrammatically one embodiment of the described invention.

In the drawings:—Figure 1 is a side elevation, partly in section of the entire apparatus; Fig. 2 is a cross section, on line A—B, of the revolving member or rotor and its inclosing shell; Fig. 3 shows the internal face and Fig. 3ª shows a cross section of one of two similar cones forming the exterior of the revolving member, and a diaphragm or diverter plate to be attached thereto; Fig. 4 shows the side and Fig. 4ª shows an end elevation of a central diaphragm and spacer-piece separating the cones; and Fig. 5 is a detail of the feed and Fig. 5ª of the discharge headers.

In the showing, element 1 is a stationary shell, provided with an air-vent 2, a pressure-closed discharge opening 3, and axial bearings 4. Through these bearings pass hollow shafts 5 and 6, secured against leakage by lubricated packing glands 7. One end of each shaft is secured to bosses of a rotary member 8. The projecting part of the shaft 5 terminates and is rotatably mounted in a glanded header 9, and the corresponding end of the shaft 6 similarly terminates in a header 10, and has means of imparting rotary movement at 11, which may be a pulley or any preferred motor.

The rotary member 8 consists of two similar hollow cones 12 rigidly joined at the base to the spider-arms 13, of a central diaphragm 14, which may have any desired thickness and thus act as a distance-piece between the cones, at the flanges 15. The cut-out portion 16 between the spider-arms thus provides a series of permanently open slot-like ports occupying most of the periphery of the rotor member and affording free communication between the contents of the rotor and the hollow space of the inclosing member 1.

The inner surface of the cones is formed with a plurality of thin, radial, partition-like arms 17, with their ends attached to the inner surface of the cones, said arms being centrally perforated at 18, and recessed as shown at 19, to receive circular plates 20. These plates have also a central perforation and their surface, when assembled, is flush with the internal faces of the arms 17.

Formed upon the central diaphragm 14, and perpendicular thereto, are thin radial arms or wings 21, registering with the arms 17, when the apparatus is assembled, to form a series of sector-like compartments, broken transversely into communicating chambers by diaphragm, 14, and the circular plates 20. The diaphragm 14 has also a central opening a little larger than the inside diameter of the hollow shafts, and the arms 21 have a central opening 23, registering with the openings in members 17, and 20. Entering the central opening of the arms 17 at the point 18 is one end of a small tube, 25, extending thence axially within the hollow shaft 5, passing through the chamber 26, in the header 9, through a packing ring 27, and terminating in the discharge opening 28.

Valved pipes 29, and 29ª either of which may be used, provide for the feeding of liquid to be treated into the apparatus. The opening which is not in use for introducing liquid may of course be closed with a threaded plug (not shown) or it may be used for the introduction of defecating chemicals such as lime or sulfur dioxid. Openings 28 and 31 respectively provide for the exit of gases or like impurities and of clarified liquid. Weighted valves 32 and 33 respectively close these openings.

In describing the operation of this structure it may be assumed that superheated defecated cane juice coming from a defecator under pressure is fed into either of the openings 29 or 29ª. The entering liquid at starting the machine completely fills the spaces therein. Upon now putting the rotor into rotation the centrifugal action within the rotor and in the whirling body of liquid in the stator produces a separation of solids at, to and past the periphery of the rotor. The solids separated in the rotor pass outwardly through the open ports into the stator, forming an annular body which is peripherally compacted by the rotating body of liquid. Air and like impurities separating accumulate at the center of the apparatus. In starting, the exits 3, 30 and 31 are closed until the apparatus is filled, air being vented through 2. Upon now putting the rotor into operation the described separation takes place. As soon as the liquid at the opening 31 is found to be clarified, liquid is allowed to escape at the openings 30 and 31 by suitably adjusting the valves, allowing a current of liquid to flow into and through the apparatus from header 10. When the liquid escaping indicates turbidity it is evident that a zone of separated solids has formed in stator 1, extending into the rotor and that this zone is becoming unduly thick. At this point the weighted valve closing 3 is opened sufficiently to allow a portion of the accumulated magma to escape. With the escape of material from 3, 30 and 31, the regular feed through opening 29 begins, and by suitably adjusting the valves the operation may now be made continuous. After starting the apparatus and suitable adjustment of the valves at 3, 30 and 31, there will result a uniform flow of clarified liquid through 31 with simultaneous separation of the solids and the like impurities. After having established this balance between the feed of foul liquid and the escape of separated impurities, it is feasible to increase the speed of the apparatus to the maximum degree desired and concomitantly increase the area of all the discharge openings to the limit compatible with the rate of rotation. The tendency of steam and disengaged gases to form a body at the center of the apparatus is counteracted by the trapping off of these substances through the tube 25 and their discharge past valve 30. Lighter liquids, such as oil, fat, and the like, which may separate also escape through this tube, together with the solids of low specific gravity, which latter if allowed to accumulate would seriously cripple if not altogether prevent continuous action.

Obviously, the machine may be kept under any degree of pressure desired, such as the pressure under which the liquid leaves the defecator. By performing the centrifugal separation under this pressure, no opportunity is afforded for the formation of buoying gas bubbles and the solids may be readily removed by the apparatus. If the pressure be allowed to drop, as is commonly the case in treating this class of liquids, the buoying gas adhering to the particles of impurities prevents quick and good separation of the solids. When running normally with the present apparatus, the liquid passing through the hollow shaft is discharged into the spaces between the radial ribs, and liquids and solids flow out radially together while opening 18 provides for a central passage of gases or other light material. The rotating liquid thrown out radially returns toward the center through the similar passages on the other side of the diaphragm and thence out through the hollow shaft. Passage of solids toward the center in following this backflow of the liquid would be against centrifugal action and hence does not occur. The separated solids escaping through the ports in the rotor accumulate against the stator to form an annular body kept smooth and homogeneous by the circulating liquid. Any gas or steam which might separate in the beginning and prevent this formation of a ring of magma or mud may be tapped off through 2. The mud accumulating as the annulus within the stator contains sufficient moisture to make it fluent and flowable and it will readily escape through 3 past the weighted valve. The method of operation is exactly the same with other liquids containing impurities of various specific gravities.

What I claim is:—

1. A centrifugal machine comprising a rotor within a stationary casing adapted to contain a body of liquid and withstand internal pressure, said rotor having peripheral passages, means for feeding liquid to be separated to the interior of the rotor, separate means for withdrawing clarified liquid and for withdrawing light impurities from the interior of the rotor and valve-controlled means for withdrawing separated matter from the inner periphery of the stationary casing.

2. A centrifugal machine comprising a rotor within a closed stationary casing adapted to contain a body of liquid and withstand internal pressure and provided with an annular channel around the periphery of said rotor, said rotor having peripheral passages communicating with said channel, means for feeding liquid to be separated to the interior of the rotor, separate means for withdrawing clarified liquid and for withdrawing light impurities from the interior of the rotor and valve-controlled means for continuously withdrawing separated solids from said channel.

3. A centrifugal machine comprising a doubly-conical rotor mounted within a stationary casing provided with venting means and with valve-controlled means for continuously removing solids, said rotor having peripheral passages opening to the interior of the casing, means for feeding liquid to the interior of the rotor, means within the rotor for causing a circuitous passage of liquid therein, means for withdrawing clarified liquid from the rotor and means for withdrawing light impurities from the rotor.

4. A centrifugal machine comprising a rotor mounted within a stationary casing provided with venting means and with valve-controlled means for continuously removing solids, said rotor comprising two hollow cones mounted base to base with intervening spacing means providing peripheral passages from their interior, means for feeding liquid to the interior of the rotor, means within the rotor for withdrawing clarified liquid from the rotor and means for withdrawing light impurities therefrom.

5. In a centrifugal machine, a rotor comprising two hollow cones mounted base to base but spaced apart to leave free communication with their interior, an inclosing stationary closed casing within which such rotor is rotatably mounted, a hollow shaft commuicating with one such cone and forming a supply conduit therefor, a hollow shaft communicating with the other cone and forming an exit conduit; valve-controlled exit means for such conduit, a conduit located within the last-stated conduit and provided with valve-controlled exit means for light impurities, and valve-controlled means for the exit of separated solids from such stationary casing.

6. In a centrifugal machine, a rotor comprising two hollow cones spaced apart to form peripheral passages, an intervening diaphragm between the cone bases, an inclosing stationary closed casing within which such rotor is rotatably mounted, a hollow shaft communicating with one such cone and forming a supply conduit therefor, a hollow shaft communicating with the other cone and forming an exit conduit, valve-controlled exit means for such conduit, a conduit located within the last-stated conduit and provided with valve-controlled exit means for light impurities, and valve-controlled means for the exit of separated solids from such stationary casing.

7. In a centrifugal machine, a rotor comprising two hollow cones spaced apart to form peripheral passages, an intervening diaphragm between the cone bases, means for forming radial flow passages within such rotor, an inclosing stationary closed casing within which such rotor is rotatably mounted, a hollow shaft communicating with one such cone and forming a supply conduit therefor, a hollow shaft communicating with the other cone and forming an exit conduit, a conduit located within the last-stated conduit and provided with valve-controlled exit means for light impurities and valve-controlled exit means for light impurities, and valve-controlled means for the exit of separated solids from such stationary casing.

8. A centrifugal machine comprising a chambered rotary member having permanently open peripheral ports, a pair of hollow shafts communicating with the interior of said member, a stationary casing inclosing the rotary member and provided with pressure-controlled exit valve means, a stationary valve-controlled inlet means for one such shaft, stationary valve-controlled liquid exit means for the other such shaft, a secondary conduit mounted within the other such shaft and valve-controlled exit means for such secondary conduit.

9. In a centrifugal machine, a rotor provided with normally open peripheral ports, an inclosing casing adapted to withstand internal pressure and having a chamber surrounding the periphery of the rotor and provided with a peripheral valve closed port, means for feeding material to be separated within the rotor, a valve controlled exit conduit communicating with the interior of the rotor near its axis for leading off clarified liquid, and a separate exit conduit communicating with the rotor to withdraw gaseous or other light impurities.

10. In a centrifugal machine, a rotor provided with normally open peripheral ports, an inclosing casing having a chamber surrounding the periphery of the rotor and provided with a peripheral valve closed port, means for feeding material to be separated within the rotor, a valve controlled exit conduit communicating with the interior of the rotor near its axis, a separate exit conduit leading from the rotor interior for withdrawing gaseous or other light impurities, and baffle means within said rotor between the inlet means for feeding material thereinto and said exit conduits.

In testimony whereof, I affix my signature in the presence of two witnesses.

FRANK E. COOMBS.

Witnesses:
K. P. McELROY,
H. SCHOENTHAL.